Patented Oct. 26, 1943

2,332,696

UNITED STATES PATENT OFFICE 2,332,696

METHOD AND MEANS OF INCREASING THE FADE RESISTANCE OF DUPLICATION COPIES

William J. Champion, La Grange, Ill., assignor to Ditto, Incorporated, Chicago, Ill., a corporation of West Virginia No Drawing. Application August 1, 1942, Serial No. 453,204

11 Claims. (Cl. 101—149.5)

The invention relates to a method and means of increasing the fade resistance of designs formed of dyes which are susceptible to fading in sunlight, and more particularly relates to a method of increasing the fade resistance and water resistance of duplication copies having characters thereon formed of water and alcohol soluble dyes such as aniline type dyes commonly used in hectograph and spirit process duplication. The invention is particularly advantageous for increasing the fade resistance of duplication copies prepared by spirit process duplication.

It is known and is disclosed in Hoskins Patent No. 2,088,417 that bentonite will combine with water and alcohol soluble dyes such as the aniline type dyes to form water insoluble lakes. These dye lakes have much greater light stability than the original dye from which they were formed. This property of bentonite has hitherto been utilized to increase the fade resistance of duplication copies by coating a copy paper with the bentonite and then transferring an aniline dye type image to the bentonite coated paper. This method which is disclosed in the Hoskins Patent No. 2,088,417 and in the Bour Patent No. 2,288,389, is quite satisfactory for obtaining fade resistant copies by the ordinary hectograph process whereby the dye image is transferred from a moist glycerin and water containing gelatin composition. In this case the dye in the form of a design is held by the glycerin-water medium probably in the completely ionized form, and contacts the bentonite coating which can absorb moisture from the gelatin mass so that conditions are ideal for the rapid and complete formation of the lake. In the case of spirit process duplication, however, the dye in the form of the design on a master copy sheet is transferred solely by alcohol solvency, and is given little chance to ionize, so that the dye and bentonite do not readily and completely react and fade resistance is not as great as may be desirable.

However, if instead of coating the copy sheets with the bentonite before duplication I coat the copy sheets after duplication with a water-containing bentonite composition, the bentonite readily reacts with the aniline type dye of the copy sheet to form a water insoluble lake of high fade resistance even in the case where the duplication copies have been prepared by spirit process duplication.

The bentonite composition which is coated over the dye design may be a suspension of bentonite in water, for example, 5% of bentonite by weight in 95% of water prepared by allowing the bentonite to swell completely and stirring to obtain an intimate and homogeneous composition. Such a composition is physically a stable colloidal suspension. However, this composition dries very slowly and has a tendency to curl and buckle the paper. This is very undesirable.

In accordance with this invention, I overcome this difficulty by preparing a bentonite and water suspension of about 20% bentonite by weight and mix this into an organic solvent which is more volatile than water, such as alcohol, benzene, ethyl acetate or the like.

However, the volatile solvent has a tendency to cause separation of the bentonite from the mixture. I have discovered that the bentonite can be maintained in suspension by incorporating a protective colloid in the composition. Any film-forming material which is soluble in the volatile solvent acts as a protective colloid and is suitable, some examples of which are ethyl cellulose, methyl cellulose, celluose acetate, nitro celluose, poyvinyl alcohol, zein and the like.

One composition which has been found suitable is prepared by mixing 20 parts by weight of bentonite with 80 parts by weight of water and allowing the mixture to stand overnight for complete swelling of the bentonite. 30 parts by weight of ethyl cellulose of a low viscosity is dissolved in 270 parts by weight of benzene by means of agitation. The bentonite-water mixture is then added slowly to the ethyl cellulose solution with vigorous agitation. This mixture is then homogenized or whipped violently to form a stable emulsion. Small amounts of emulsifying agents may be used if long term stability is desired.

The above composition was then coated on a copy sheet containing characters formed of water and alcohol soluble duplication dyes such as the aniline type dyes. On drying a thin transparent non-tacky coating was obtained. Copies so obtained were about ten times more resistant to light fading than copies which had not been treated with bentonite. Aniline dye duplication copies which had been made by spirit process duplication and then coated with the above composition were much more fade resistant than spirit process duplication copies made by first coating the copy sheet with bentonite and then contacting the coated sheet with a design on a master sheet.

Since this invention is particularly useful in increasing the fade resistance of spirit process duplication copies, a brief description of this process follows:

In spirit process duplication a master copy is generally prepared in reverse by drawing, writing, typing or otherwise producing the designs on the master sheet, behind which is a sheet of suitably prepared color-carrying paper with its inked surface facing the master sheet so that color constituents of the ink on the carbon paper are transferred to the back of the sheet forming a reverse copy of the design. In preparing copies from this master sheet, the dye characters are moistened with a dye solvent, generally an alcohol type solvent. This is generally done by moistening the copy sheet with a substantially non-aqueous solvent such as an alcohol type solvent and contacting the moistened copy sheet with the master copy sheet containing the design, whereby a positive image of the original design is reproduced upon the copy sheet.

The invention is particularly useful for increasing the fade resistance of copies made on paper which contains substantially no filler and which is relatively non-absorbent such as a high rag content paper commonly used for bonds.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

It is to be understood that the term "bentonite" as used in the claims is intended to cover bentonite and equivalent substances, including all materials of the bentonite type such as beidellite and similar colloidal clays which act as lake-forming materials for aniline dyes.

I claim:

1. The method of increasing the fade resistance of a design formed of a water and alcohol soluble dye which is susceptible to fading in sunlight, which method comprises applying a composition comprising bentonite, water and a liquid which is more volatile than water to said design.

2. The method of increasing the fade resistance of a design formed of a water and alcohol soluble dye which is susceptible to fading in sunlight, which method comprises applying a colloidal suspension of bentonite in a carrier comprising water and a liquid which is more volatile than water to said design.

3. The method of increasing the fade resistance of a design formed of a water and alcohol soluble dye which is susceptible to fading in sunlight, which method comprises coating a sheet having said design thereon with a composition comprising bentonite, water, a solvent which is more volatile than water, and a film-forming material soluble in said volatile solvent, and drying said composition to form a film on said sheet.

4. The method of increasing the fade resistance of duplication copies, which method comprises applying a colloidal suspension of bentonite in a carrier comprising water and a liquid which is more volatile than water to a duplication copy having a design thereon formed of an aniline type dye.

5. The method of increasing the fade resistance of a duplication copy having a design of an aniline type dye, which method comprises coating said duplication copy with a composition comprising bentonite, water, a solvent which is more volatile than water, and a film-forming material soluble in said volatile solvent, and drying said composition to form a film.

6. In spirit process duplication wherein a design on a copy sheet is formed by contact of a copy sheet with a master sheet in the presence of a solvent, the step of applying a colloidal suspension of bentonite in a carrier comprising water and more volatile liquid to the design on the copy sheet.

7. In spirit process duplication wherein a design on a master sheet is reproduced in reverse on a copy sheet by contacting the master sheet and a copy sheet in the presence of a substantially non-aqueous solvent, the step of coating said design on the copy sheet with a composition comprising bentonite, water, a solvent which is more volatile than water, and a film-forming material soluble in said volatile solvent.

8. A copy sheet comprising a base sheet having a design thereon of a water soluble dye which is susceptible to fading in sunlight and a substantially transparent coating over said design comprising particles of bentonite held on said base sheet by a substantially transparent and continuous film of a water insoluble plastic material.

9. A copy sheet comprising a sheet of bond paper having a design thereon of a water soluble dye which is susceptible to fading in sunlight and a substantially transparent coating over said design comprising particles of bentonite held on said base sheet by a substantially transparent and continuous film of a water insoluble plastic material.

10. A liquid coating composition adapted for coating over a duplicating design to increase the fade resistance thereof, said composition comprising a suspension of bentonite in a carrier comprising water, a solvent which is more volatile than water, and a protective colloid adapted to maintain the bentonite in suspension.

11. A liquid coating composition adapted for coating over a duplicating design to increase the fade resistance thereof, said composition comprising a suspension of bentonite in a carrier comprising water, a solvent which is more volatile than water, and a film-forming material which is soluble in said volatile solvent.

WILLIAM J. CHAMPION.